United States Patent [19]
Buzak et al.

[11] Patent Number: 5,313,223
[45] Date of Patent: May 17, 1994

[54] CHANNEL ARRANGEMENT FOR PLASMA ADDRESSING STRUCTURE

[75] Inventors: Thomas S. Buzak, Aloha; Dennis W. Prince, Banks; William W. Stein, Beaverton, all of Oreg.; Paul C. Martin, Vancouver, Wash.

[73] Assignee: Tektronix, Inc., Wilsonville, Oreg.

[21] Appl. No.: 935,608

[22] Filed: Aug. 26, 1992

[51] Int. Cl.[5] .......................... G09G 3/10; H01J 17/49
[52] U.S. Cl. ........................................ 345/60; 345/98; 313/586
[58] Field of Search ............... 340/769, 771, 773, 779, 340/794; 313/484, 491, 582, 583, 586, 488; 315/169.4; 345/4, 60, 62, 65, 66, 3, 71, 90, 98

[56] References Cited

U.S. PATENT DOCUMENTS

| | | | |
|---|---|---|---|
| 3,262,010 | 7/1966 | Kazan | 315/63 |
| 4,038,577 | 7/1977 | Bode et al. | 313/586 |
| 4,147,960 | 4/1979 | Andoh | 340/779 |
| 4,322,659 | 3/1982 | De Jule et al. | 315/169.4 |
| 4,352,101 | 9/1982 | De Jule | 340/769 |
| 4,533,913 | 8/1985 | Tezucar et al. | 340/771 |
| 4,554,537 | 11/1985 | Dick | 340/779 |
| 4,771,183 | 9/1988 | McGlynn | 358/213.11 |
| 4,896,149 | 1/1990 | Buzak et al. | 340/794 |
| 5,077,553 | 12/1991 | Buzak | 340/794 |
| 5,214,521 | 5/1993 | Kwon et al. | 340/771 X |

OTHER PUBLICATIONS

Mikoshiba, Shigeo, "Plasma Displays," Seminar 10, SID 1987, 10.2–10.37.
Dick, George W., "Plasma Display Panel Techniques," Seminar 2, SID 1985 2.2-1–2.2-54.

*Primary Examiner*—Alvin E. Oberley
*Assistant Examiner*—Kara A. Farnandez
*Attorney, Agent, or Firm*—John D. Winkelman; Paul S. Angello; Mark M. Meininger

[57] ABSTRACT

A plasma addressing structure functioning as a display panel (52) includes an ionizable gas captured within a network (110) of intersecting channels formed by multiple spaced-apart islands (60) arranged in substantially parallel rows (62) projecting from the major surface (104) of an underlying substrate (64). The network of channels includes elongated channels (112) that are positioned between adjacent rows of islands, and spur channels (114) that extend between individual islands in each row and couple adjacent elongated channels. The gas in the network of channels is selectively ionized to address display elements (54), which are aligned with the islands positioned along each of the island rows. Each island has a top surface or plateau (128) that is spaced-apart from and substantially parallel to the major surface from which the island projects. The plateaus provide a relatively large surface area for supporting addressing structure components such as a layer (68) of electro-optic material and a layer (96) of dielectric material.

15 Claims, 7 Drawing Sheets

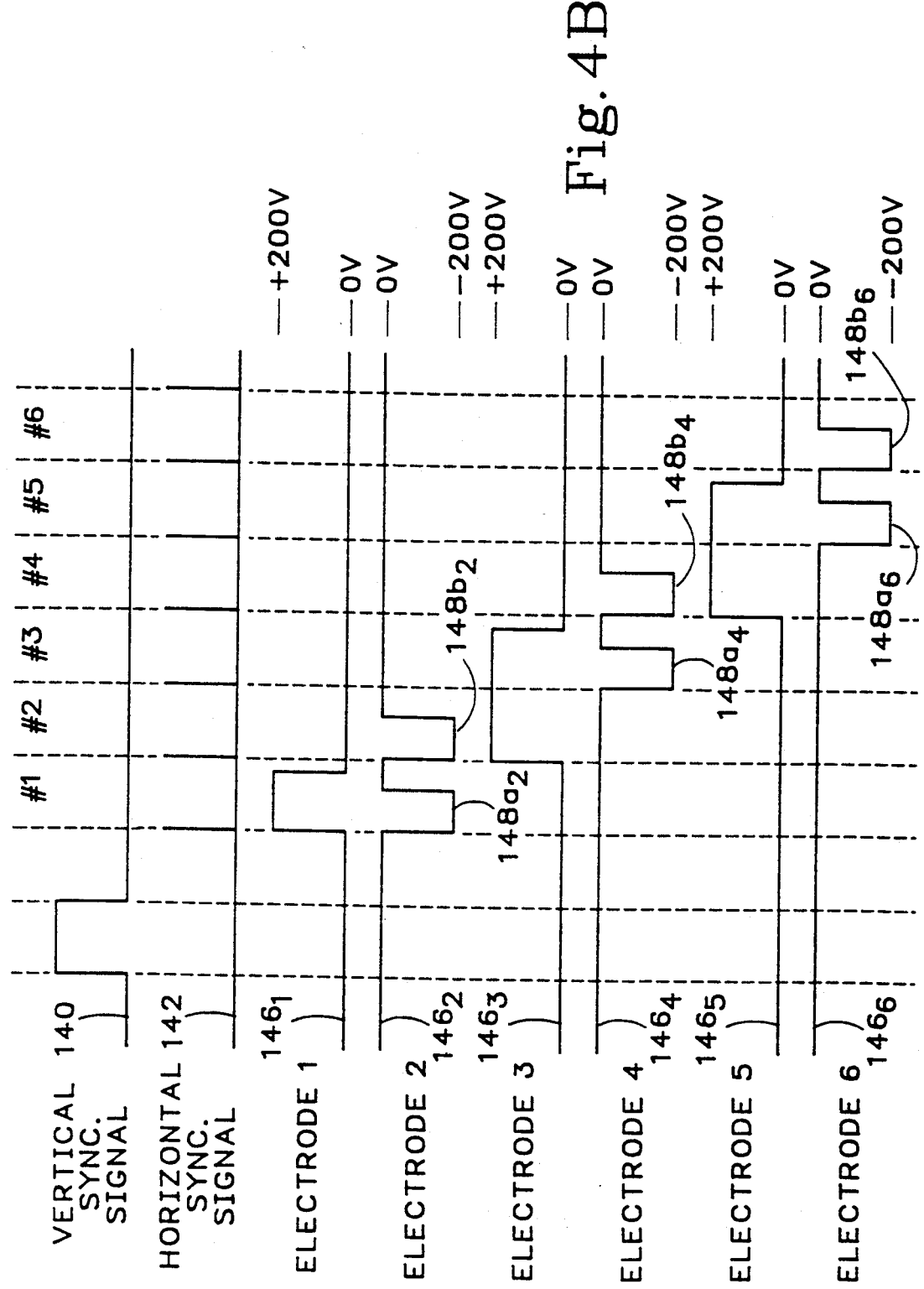

CHANNEL ARRANGEMENT FOR PLASMA ADDRESSING STRUCTURE

TECHNICAL FIELD

The present invention relates to plasma addressing structures having closed channels for containing a gas that is selectively ionized to address data elements and, in particular, to the arrangement of the channels in such addressing structures.

BACKGROUND OF THE INVENTION

Plasma addressing structures may be employed in a variety of applications including data storage devices, video cameras, and flat panel liquid crystal displays. One such addressing structure is described in U.S. Pat. No. 4,896,149 of Buzak et al. for "Addressing Structure Using Ionizable Gaseous Medium".

A preferred embodiment of this addressing structure includes an ionizable gas captured within each of multiple channels that are separated by elongated support structures, which extend in one direction across a display screen with the channels. The support structures provide complete isolation of the gas in each of the channels. The gas in each channel is selectively ionized to address a row of display elements aligned with the channel. The gas is ionized by a gas ionizing structure that includes an electrical reference electrode or anode and a data strobe electrode or cathode that extend along the length of each channel.

While the gas in a channel is ionized, data signals are delivered to the addressed display elements on multiple data electrodes extending across the display screen in a direction perpendicular to the direction in which the channels extend. A liquid crystal material positioned between the channel arrangement and the data electrodes is responsive to the data signals to form a display image.

FIG. 1A is an elevated fragmentary view of a prior art glass substrate 10 within which multiple parallel channels 12 are inscribed or etched for containing an ionizable gas. Adjacent channels 12 are separated by sidewalls 20 that define multiple elongated support structures 22 with top surfaces 16 that support various addressing structure components including an appropriate dielectric sheet and a liquid crystal material (not shown).

A strobed row electrode or cathode 30 and a grounded reference electrode or anode 32 are positioned on an inner surface 34 of each channel 12. Cathodes 30 and anodes 32 are relatively thin, narrow metal coatings. Each of cathodes 30 receives a row strobe signal from a corresponding output amplifier 36 of a data strobe circuit 38 for selectively ionizing a gas contained within the channel 12.

FIG. 1B is a cross-sectional view of substrate 10 showing that support structures 22 have relatively broad bases 42 and relatively narrow top surfaces 16. The widths 44 and 46 of respective channels 12 and bases 42 are substantially greater than the widths 48 of top surfaces 16. As a consequence, top surfaces 16 represent only a small proportion of the surface area of substrate 10, thereby providing correspondingly little support for dielectric sheet 24, the liquid crystal material, and the other components positioned over and supported by substrate 10.

The relatively little surface area provided by top surfaces 16 to support dielectric sheet 24 and other components allows then to be excessively pliant or flexible. Such pliancy is undesirable because it allows the possibility of fracture of the dielectric sheet and excessive variation in spacing of the liquid crystal.

SUMMARY OF THE INVENTION

An object of the present invention is, therefore, to provide a channel arrangement in a plasma addressing structure.

Another object of this invention is to provide such an arrangement that provides a relatively large surface area for supporting addressing structure components.

A further object of this invention is to provide such an arrangement that allows the manufacture of a plasma addressing structure with a reduced susceptibility to flexure.

The present invention includes an arrangement of channels for containing an ionizable gas in a plasma addressing structure. In a preferred embodiment, the plasma addressing structure is employed in a display panel having a two-dimensional array of display elements.

The addressing structure includes an ionizable gas captured within a network of channels formed by multiple spaced-apart islands arranged in substantially parallel rows (hereinafter "island rows") projecting from the major surface of an underlying substrate. The islands in alternate ones of the island rows are offset from each other. Accordingly, the network of channels includes elongated channels that are positioned between adjacent island rows and spur channels that extend between individual islands in each row and couple adjacent elongated channels.

The gas in the network of channels is selectively ionized to address rows of display elements, which are aligned with the islands positioned along each of the island rows. The gas is ionized by a gas ionizing structure that includes one electrode extending along the length of the elongated channel between each adjacent pair of island rows. The electrodes on opposite sides of an island row function as an anode and a cathode to ionize the gas in the vicinity of the island row. Specifically, the electrodes ionize the gas contained within the spur channels coupling the elongated channels in which the electrodes are positioned.

Each island has a top surface or plateau that is spaced-apart from and substantially parallel to the major surface from which the island projects. The plateaus of the islands have a combined surface area that is substantially greater than the spacings between the islands formed by the network of channels. The plateaus provide, therefore, a relatively large surface area for supporting addressing structure components. This large surface area reduces the flexure to which the supported components are susceptible.

Additional objects and advantages of the present invention will be apparent from the detailed description of the preferred embodiment thereof, which proceeds with reference to the accompanying drawings.

BRIEF DESCRIPTION OF THE DRAWINGS

FIGS. 4A, 4B, 4C, and 4D are timing diagrams showing signal sequences for addressing successive rows of data storage elements in the addressing structure of the present invention.

DETAILED DESCRIPTION OF PREFERRED EMBODIMENTS

Figures 1A, 1B:
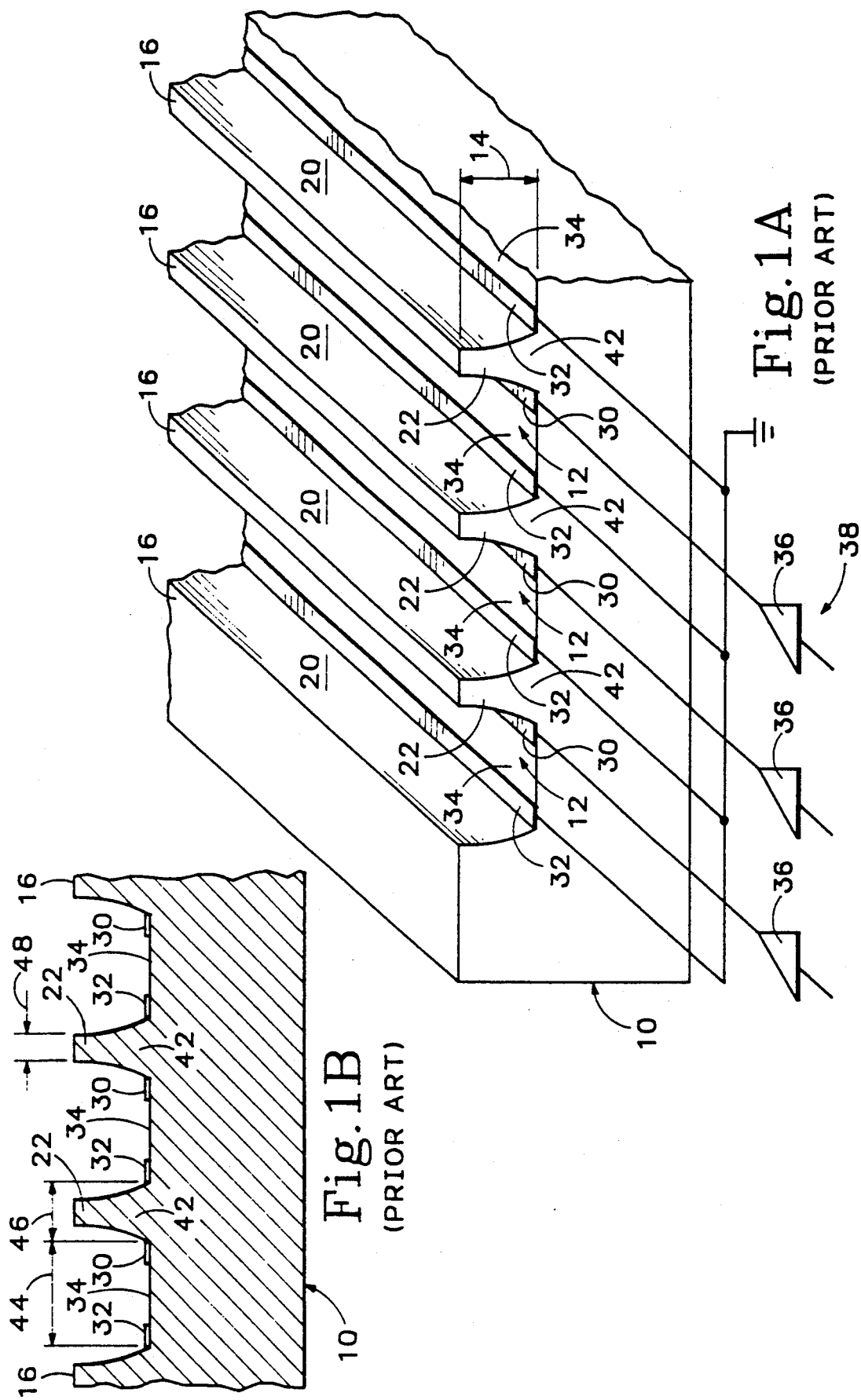
FIG. 1A is an enlarged fragmentary view of a prior art substrate with channels for containing the ionizable gas of a plasma addressing structure.
FIG. 1B is a fragmentary sectional side view of the prior art substrate of FIG. 1A.
Figure 2:
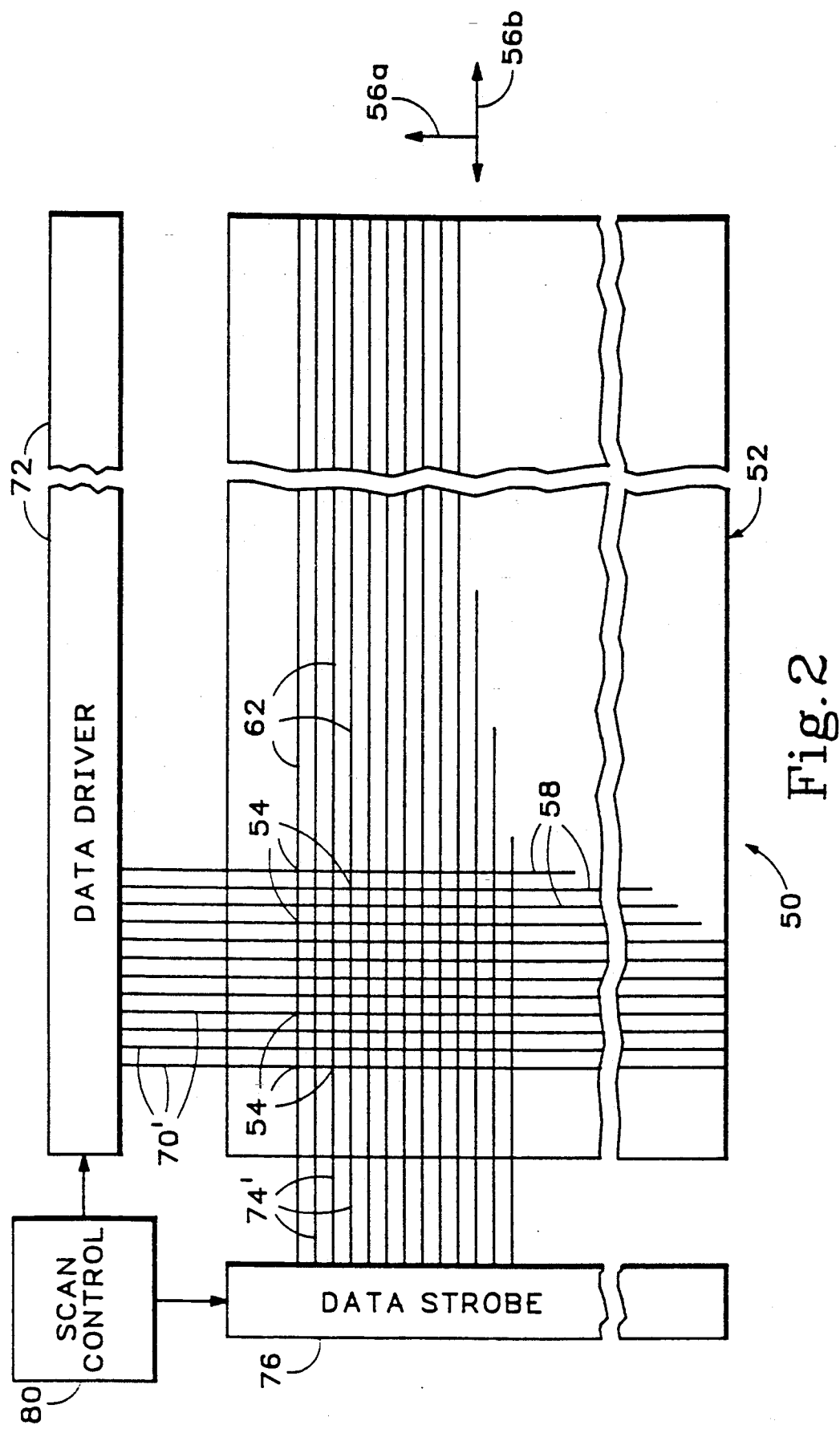
FIG. 2 is simplified a front view of a display panel and associated drive circuitry of a display system incorporating an addressing structure channel arrangement of the present invention.

FIG. 2 shows a flat panel display system 50 having an addressing structure functioning as a display panel 52. A rectangular planar array of nominally identical data storage or display elements 54 are mutually spaced apart by predetermined distances in vertical and horizontal directions 56a and 56b, respectively. In a high definition television format, display panel 52 would include about 2000 display elements 54 in each of about 1000 horizontal rows.

Figure 3:
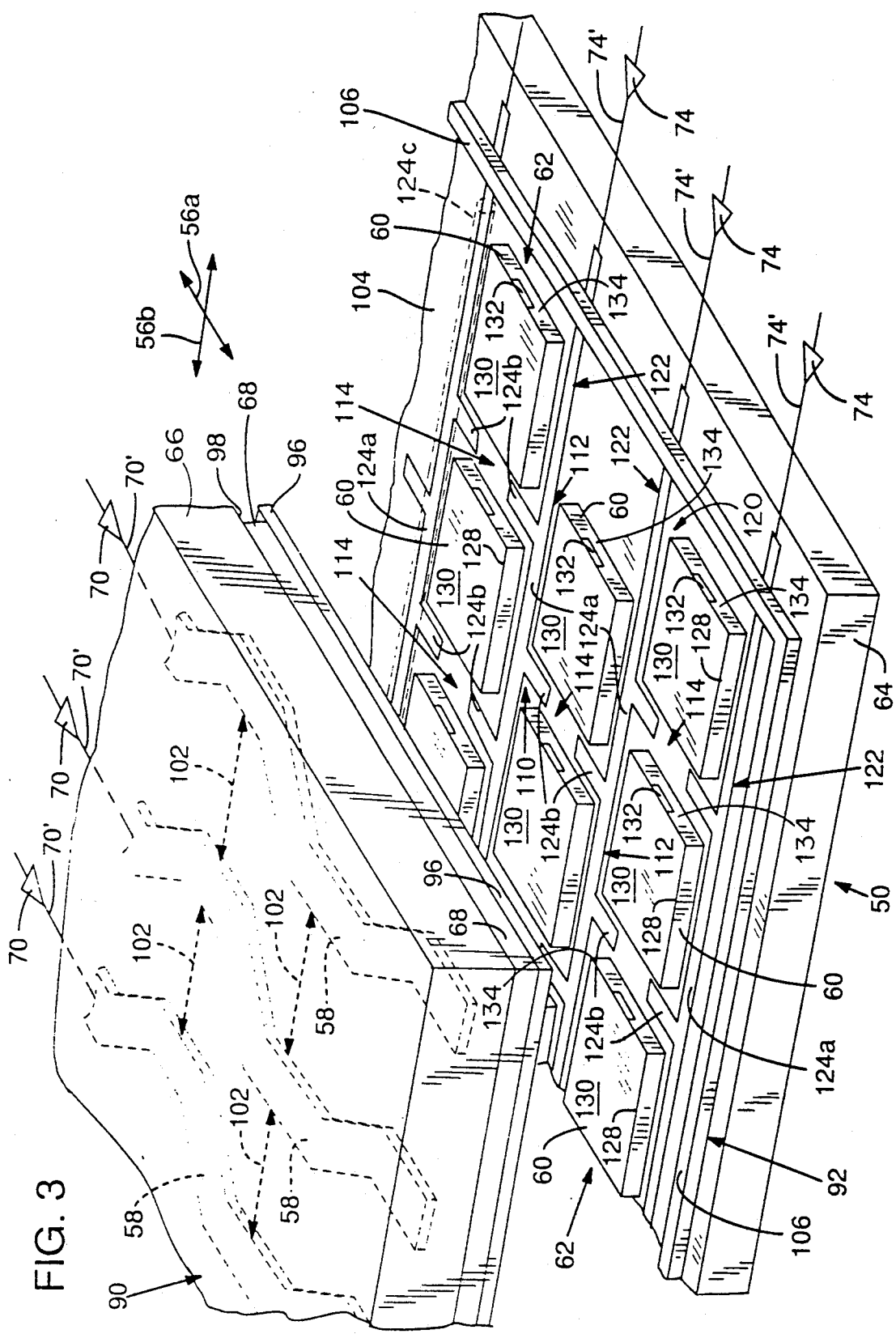
FIG. 3 is an enlarged fragmentary isometric view showing the layers of structural components forming the display panel of FIG. 2.

With reference to FIGS. 2 and 3, each display element 54 in the array represents the overlapping portions of thin, narrow electrodes 58 arranged in vertical columns and spaced apart islands 60 that are arranged in horizontal rows 62 and project from a major surface of an electrically nonconductive, optically transparent and colorless substrate 64. (Electrodes 58 are hereinafter referred to as "column electrodes 58," and rows 62 are hereinafter referred to as "island rows 62.") The row of display elements 54 aligned with each island row 62 represents one line of display data.

The widths of column electrodes 58 and islands 60 determine the dimensions of display elements 54, which are of generally rectangular shape. As will be further described below, column electrodes 58 are deposited on a major surface of an electrically nonconductive, optically transparent substrate 66 held in face-to-face relation to substrate 64.

A layer 68 of electro-optic material, such as a nematic liquid crystal, is captured between substrates 64 and 66. Skilled persons will appreciate that certain systems, such as a reflective displays of either the direct view or projection type, would require that only one of the substrates be optically transparent.

Column electrodes 58 receive data drive signals of the analog voltage type developed on parallel output conductors 70' by different ones of the output amplifiers 70 of a data driver or drive means 72. Island rows 62 receive voltage signals developed on parallel output conductors 741 by different ones of the output amplifiers 74 of a data strobe 76. To synthesize an image on substantially the entire area of display surface 52, display system 48 employs a scan control circuit 80 that coordinates the functions of data driver 72 and data strobe 76 so that all columns of display elements 54 of display panel 50 are addressed row by row in row scan fashion.

Display panel 50 includes a pair of generally parallel electrode structures 90 and 92 spaced apart by layer 68 of electro-optic material and a thin layer 96 of dielectric material, such as glass, mica, or plastic. Electrode structure 90 includes substrate 66 that has deposited on its inner surface 98 column electrodes 58 formed of optically transparent, electrically conductive indium tin oxide to form a pattern of undulate stripes, as explained below. Adjacent pairs of column electrodes 58 are spaced apart by a distance 102, which defines the horizontal space between next adjacent display elements 54 in a row.

Electrode structure 92 includes substrate 64 with an inner surface 104 from which projects multiple substantially parallel island rows 62 and a perimeter support ridge 106. Islands 60 of island rows 62 may be formed by inscribing into substrate 64 with photochemical etching, bonding islands 62 to surface 104, or similarly forming islands 60 on layer 96 of dielectric material to project toward surface 104.

Island rows 62 form a channel network 110 for containing the ionizable gas. Channel network 110 includes elongated channels 112 that are positioned between adjacent island rows 62, and spur channels 114 that extend between individual islands 60 in each island row 62 and couple adjacent elongated channels 112.

Elongated channels 112 and spur channels 114 intersect each other and extend longitudinally in transverse directions that are preferably perpendicular. Islands 60 in adjacent island rows 62 are offset from each other so that each spur channel 114 across an island row 62 has a projection that intersects and preferably bisects an island 60 in an adjacent island row 62.

The gas captured within channel network 110 is selectively ionized by a gas ionizing structure 120 to address selected display elements 54. Ionizing structure 120 includes one electrode 122 extending along the length of each elongated channel 112. Each electrode 122 includes an elongated electrode segment 124a extending along elongated channel 112 and electrode spurs 124b that branch off of elongated electrode segment 124a into intersecting spur channels 114. Electrode spurs 124b extending into a spur channel 114 from opposite sides of an island row 62 do not contact each other, thereby to maintain electrical separation of adjacent electrodes 122.

Electrodes 122 in the immediate pair of elongated channels 112 on opposite sides of an island row 62 function as an anode and a cathode to ionize the gas (i.e., form a plasma) in the vicinity of the island row 62. The plasma is formed primarily in spur channels 114 extending across the island row. In preferred embodiments, electrodes 122 functioning as an anode and a cathode receive potentials of about +200 volts and −200 volts, respectively, as described below in greater detail. Elongated electrode segments 124a could include a raised electrode structure in the form of a wire 124c (one shown in outline in FIG. 3) having a diameter comparable to the height of islands 60 to prevent the plasma formed for one island row 62 from incidentally migrating to an adjacent island row 62.

Display elements 54 represent the overlapping portions of column electrodes 58 and islands 60. The pattern of undulate stripes formed by column electrodes 58 allows each of them to overlap an island 60 in each island row 62. It will be appreciated, however, that column electrode 58 could form different patterns for different arrangements of islands 60.

Each island 60 has a planar top surface or plateau 128 that is spaced-apart from and substantially parallel to surface 104 of substrate 64. A layer 130 of electrically conductive, optically transparent and colorless material such as indium tin oxide covers each plateau 128. Layer 130 on each plateau 128 includes a tab portion 132 that extends along a side 134 of island 60 into each adjacent spur channel 114. Tab portions 132 provide an electrical coupling between the plasma formed in a spur channel 114 and layer 130 on a plateau 128.

The plasma formed within spur channels 114 of an island row 62 provides an electrically conductive path between the immediately adjacent electrode 122 functioning as an anode (hereinafter "anode electrode 122") and conductive layers 130 on plateaus 128. Conductive layers 130 communicate with layer 68 of liquid crystal material through layer 96 of dielectric material. The plasma in a spur channel 114 couples anode electrode 122 to the portion of liquid crystal layer 68 positioned over the adjacent island 60. This allows layer 68 of liquid crystal material to sample the analog data voltages that are simultaneously applied to column electrodes 58 and thereby form a display image.

The ionizable gas contained within channel network 110 operates as an electrical switch that changes between binary switching states as a function of ionizing voltages applied to electrodes 122. The switches are connected between anode electrodes 122 and layer 68 of liquid crystal material and allow selected display elements 54 to be addressed. The absence of ionizing voltages allows the gas within the channel network 110 to be in a nonionized, nonconducting state, thereby causing the ionizable gas to operate as an open switch. Ionizing voltages applied to a pair of adjacent electrodes 122 causes the gas within spur channels 114 between the pair of electrodes 122 to be in an ionized, conducting state, thereby causing the ionizable gas to operate as a closed switch.

Extinguishing the plasma acts to remove the conducting path (i.e., open the switch), thereby allowing the data voltage carried on column electrodes 58 to be held across layer 68 of liquid crystal material in a manner analogous to the operation of a charged capacitor. The voltages remain stored across layer 68 of the liquid crystal material until voltages representing a new line of data in a subsequent image field are developed across layer 68. The above-described addressing structure and technique provide signals of essentially 100% duty cycle to every one of the display elements 54.

Layer 96 of dielectric material functions as an isolating barrier between the ionizable gas contained within channel network 110 and layer 68 of liquid crystal material. The absence of dielectric layer 96 would permit either the liquid crystal material to flow into the channel network 110 or the ionizable gas to contaminate the liquid crystal material. However, dielectric layer 96 may be eliminated from displays that employ an inorganic electro-optic material such as an electroluminescent material.

Plateaus 128 of islands 60 have a combined surface area that is substantially greater than the spacing between islands 60 formed by channel network 110. Plateaus 128 provide, therefore, a relatively large surface area for supporting dielectric layer 96 and layer 68 of liquid crystal material. Moreover, this large supporting surface area reduces the flexure to which dielectric layer 96 and layer 68 of liquid crystal material are subjected, thereby improving the spacing uniformity of the liquid crystal layer.

To ensure the proper operation of the display or memory system, it is important to ensure that unwanted ionized conditions are not created in the gas contained in the channels. To prevent such unwanted firing of the gas contained in an unselected channel in electrode structure 100, there are three conditions that should be met.

First, the gas in any channel can be ionized only at the proper moment in the scanning sequence. This condition pertains to preventing not only a misfiring of gas in an unselected channel by the presence of improper voltages on the channel electrodes but also a spurious misfiring of stored charge in an unselected channel.

Second, the duty cycles for the electrode drive signals applied to each channel electrode should be small and substantially constant as respects all of the electrodes driven, and the electrode drive signals should preferably return to a ground potential upon completion of the ionization of gas in a channel. The reason for a small, substantially constant duty cycle is that the drive signal voltages applied to the channel electrodes are capacitively coupled to the liquid crystal material affecting the voltage stored across it; therefore, drive signals with a longer duty cycle have a greater effect as a form of crosstalk on the stored voltage. The return to ground potential is preferable because superimposing or "floating" the data drive voltages on a nonground potential would otherwise be necessary to minimize crosstalk.

Third, the channel electrode drive signal voltages are preferably the same as or lower than those used to drive electrode structures in a unichannel configuration. This condition constrains the voltages to those of currently available drive circuits.

FIGS. 4A, 4B, 4C, and 4D are timing diagrams showing alternative signal timing sequences for addressing successive rows of display elements 54 in display system 50. Each of FIGS. 4A, 4B, 4C, and 4D shows a vertical synchronization pulse signal 140 representing the start of an image frame and a horizontal synchronization pulse signal 142 representing selected ones of the rows of display elements 54 in the image frame. Synchronization pulse signals 140 and 142 are generated by scan control circuit 80 (FIG. 2).

The rows of display elements 54 are identified by row numbers that correspond to the sequence in which the rows are addressed by display system 50. The pair of electrodes 122 on opposite sides of an island row 62 identified by the variable N as the N-numbered row of display elements 54 are designated the N- and (N+1)-numbered electrodes 122. The addressing signal applied to an N-numbered electrode is identified by an addressing signal reference numeral with a corresponding subscript N.

Figure 4A:
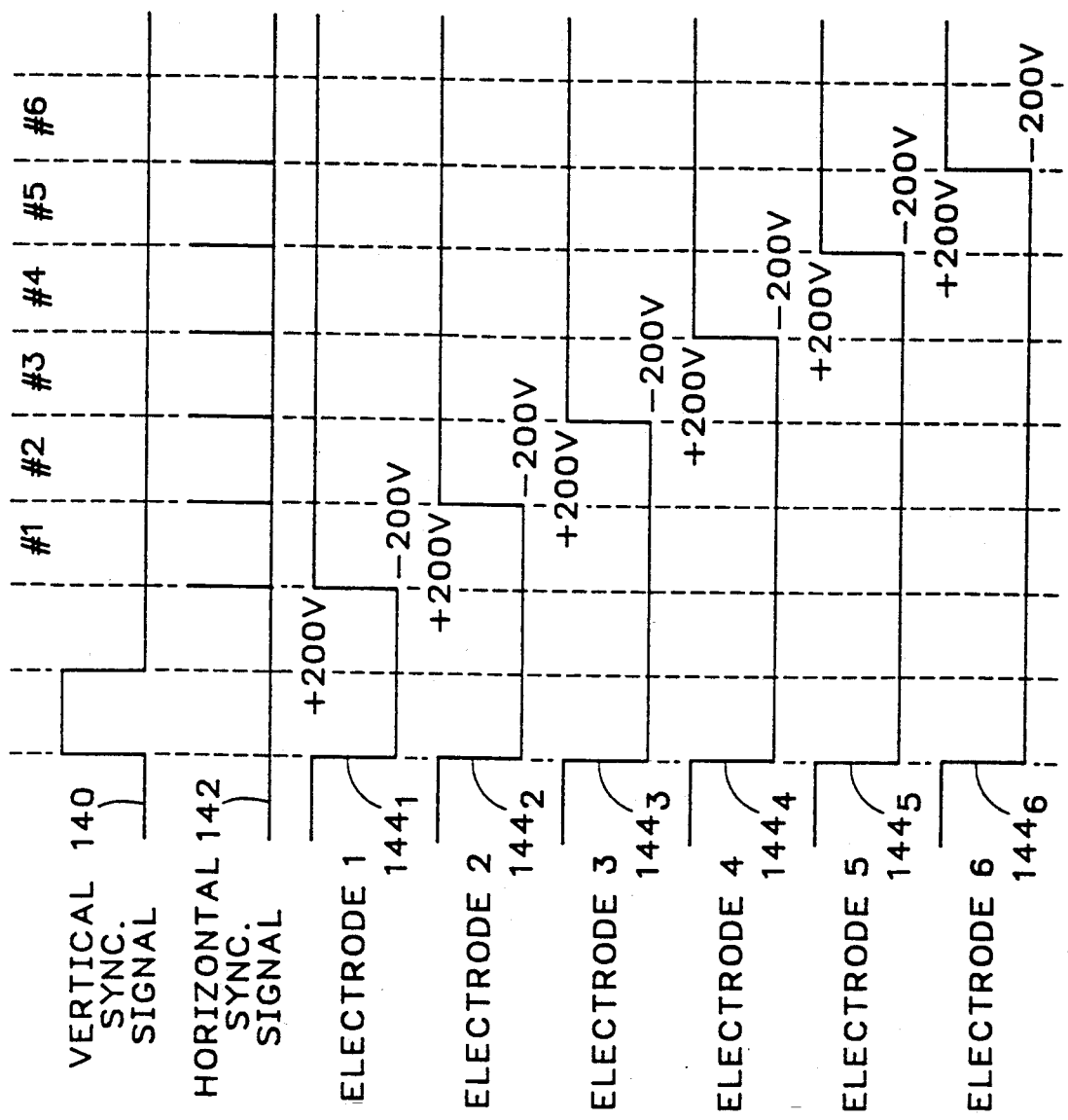

FIG. 4A shows the timing of addressing signals $144_N$ for a single-ended drive system. Each of addressing signals $144_N$ includes an initial LOW potential, preferably of about $-200$ volts, that is delivered to electrodes 122 in coordination with vertical synchronization pulse signal 144. The LOW potential of each addressing signal $144_N$ is maintained until the N-numbered row of display elements 54 is addressed.

In particular, addressing signal $144_N$ applied to N-numbered electrode 122 adjacent an N-numbered row of display elements 54 steps to a HIGH potential, preferably about $+200$ volts, in coordination with the horizontal synchronization pulse immediately preceding the addressing of that row. As a result, N- and (N+1)-numbered electrodes 122 (e.g., electrodes 1 and 2) on opposite sides of the N-numbered row of display elements 54 being addressed (e.g., row 1) have respective HIGH and LOW potentials that ionize the gas in spur channels 114. A benefit of the single-ended drive system of FIG. 4A is that it employs relatively simple drive circuitry. However, a disadvantage of the single-ended drive system is that for the row drive electrodes there are nonconstant, progressively increasing row drive duty cycles that are dependent on location in the firing scheme. Nonconstant row drive duty cycles, together with those of large values, promote a "front-to-back" crosstalk that worsens for the lower (i.e., higher numbered) rows. Front-to-back crosstalk arises from incidental capacitive couplings between all the pixels in a column or row.

FIG. 4B shows the timing of addressing signals $146_N$ for a unipolar differential drive system in which the odd- and even-numbered electrodes 122 receive odd- and even-numbered addressing signals $146_N$ of HIGH and LOW potentials, respectively. The HIGH potentials of odd-numbered addressing signals $146_N$ are maintained constantly on odd-numbered electrodes 122 during the addressing of an adjacent pair of rows of display elements 54, except electrode number 1. The LOW potentials of even-numbered addressing signals $146_N$ are applied to even-numbered electrodes 122 as a pair of discrete LOW potential signals $148a_N$ and $148b_N$ during the addressing of adjacent rows of display elements 54.

With reference to addressing signals $146_2$, $146_3$, and $146_4$, for example, low potential signals $148b_2$ and $148a_4$ cooperate with the HIGH potential of addressing signal $146_3$ to address respective rows 2 and 3 of display elements 54. As a result, each odd-numbered electrode 122 receiving the HIGH potential of an odd-numbered addressing signal $146_N$ functions as the anode for each of the pair of immediately adjacent even-numbered electrodes 122. LOW potential signal $148b_2$ terminates before the addressing of rows in coordination with LOW potential signal $148a_4$ to shorten the ionization decay time. Similarly, the HIGH potential of addressing signal $146_1$ terminates before the addressing of row 4 of addressing elements 54.

Figure 4C:
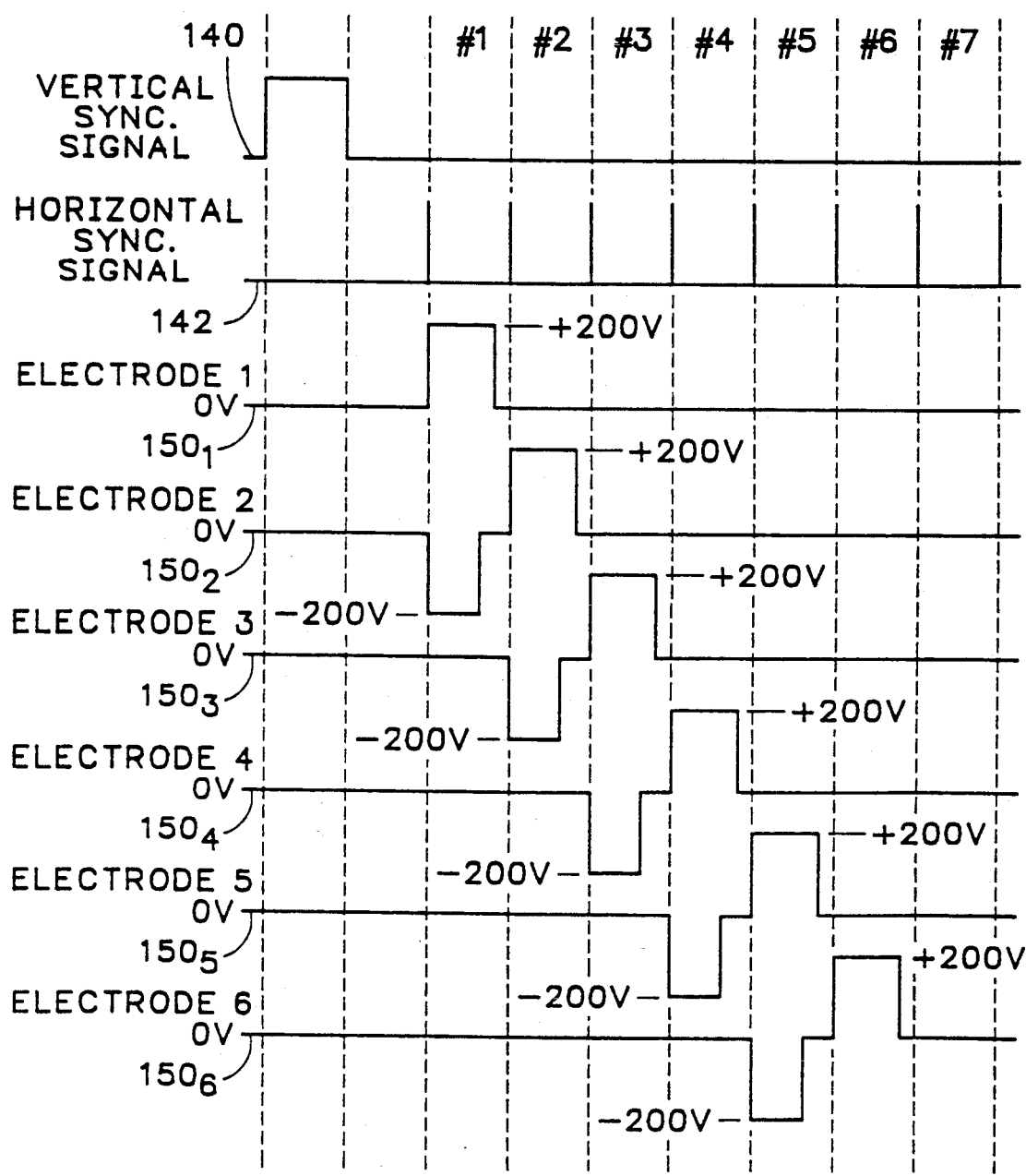

FIG. 4C shows the timing of addressing signals $150_N$ for a bipolar differential drive system in which each of electrodes 122 (other than electrode 1) receives HIGH and LOW potentials for addressing adjacent rows of display elements 54, and otherwise receive a potential of zero volts. Each electrode 122 other than electrode 1 functions alternately as a cathode and an anode during the addressing of the immediately adjacent two rows of display elements 54. Both the HIGH and LOW potentials applied to an adjacent pair of N- and (N+1)-numbered electrodes 122 are terminated before the addressing of the (N+1)-numbered row of display elements 54, thereby to shorten the ionization decay time as described with reference to the unipolar differential drive system of FIG. 4B.

Figure 4D:
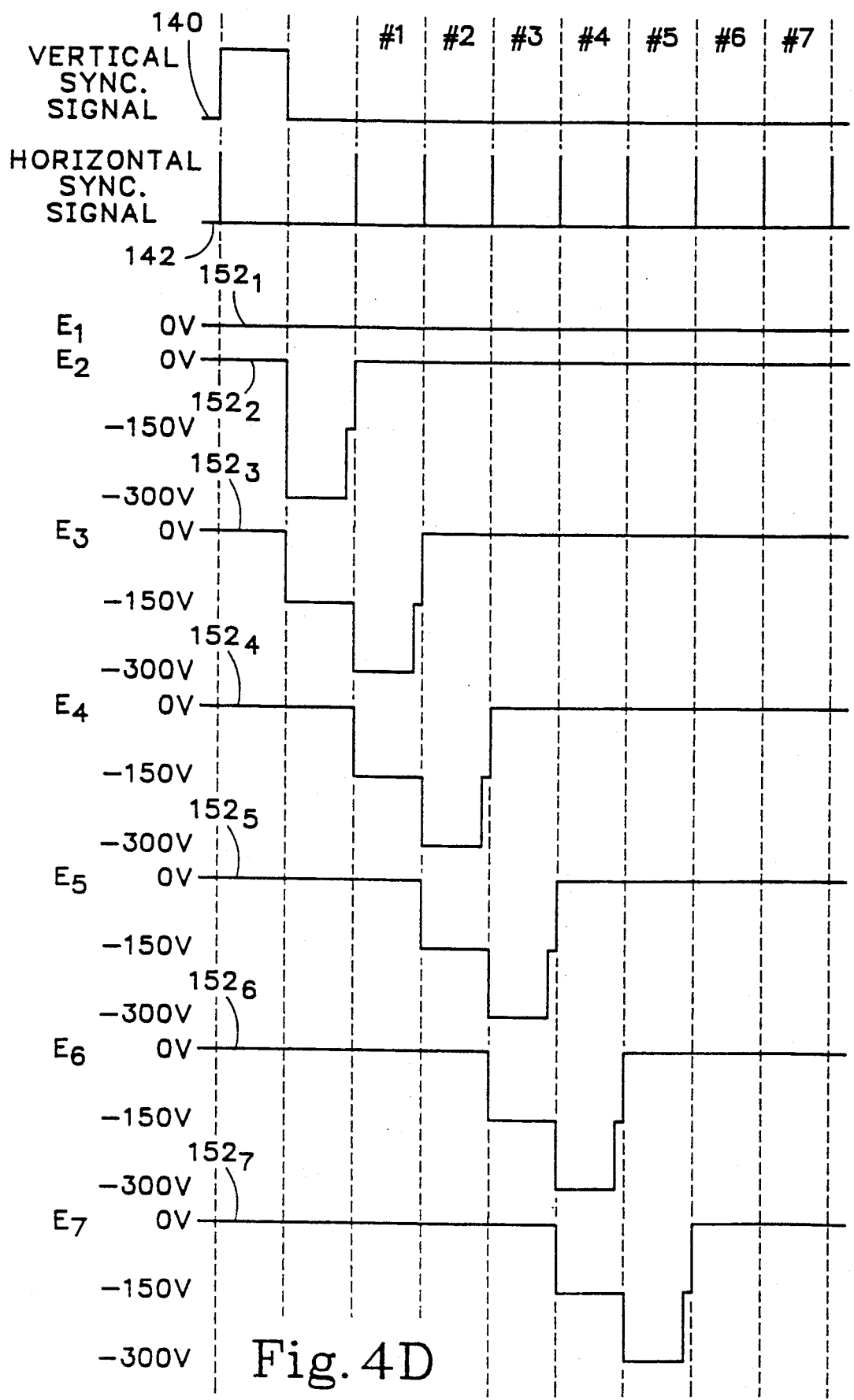

FIG. 4D shows the timing and voltage level relationships among addressing signals $152_N$. FIG. 4D also shows that the addressing signals applied to the first two electrodes driven after the start of a scan operation differ from those sequentially applied to the remaining electrodes. The reason is that these electrodes are common to the first channel to be selected, which thus does not follow a previously fired adjacent channel.

Each electrode other than electrode 1 functions alternately as a cathode and an anode during the addressing of the immediately adjacent two rows of display elements. For example, a potential difference of 300 volts between the addressing signals applied to adjacent electrodes 3 and 4 during addressing of row 3 is sufficient to cause ionization of gas between the electrodes. Simultaneously, a potential difference of 150 volts between the addressing signals applied to adjacent pairs of electrodes 4 and 5 and 5 and 6 is insufficient to either sustain or initiate a plasma ionization of gas aligned with those electrodes. The addressing signal applied to electrode 5 establishes the midpoint potential difference of 150 volts and acts as a buffer for the next to be selected row from the full 300 volt potential difference. Near the conclusion of the selection of a row, the addressing signal applied to electrode 4 increases to a $-150$ volt level, which shortens the ionization decay time.

During the beginning of the selection of the next row, the addressing signal applied to electrode 3 increases to ground potential and the addressing signal applied to electrode 5 decreases to $-300$ volts, thereby developing a potential difference of 300 volts between electrodes 4 and 5 to ionize gas for addressing row 4. The addressing drive signal applied to electrode 6 drops at this time to $-150$ volts to buffer the next to be selected row of display elements. The signals applied to the selected row return to ground potential upon selection of the next to be selected channel and thus helps prevent the misfiring of any charge stored in the just previously selected channel.

It will be obvious to those having skill in the art that many changes may be made in the above-described details of the preferred embodiment of the present invention without departing from the underlying principles thereof. The scope of the present invention should, therefore, be determined only by the following claims.

We claim:

1. In an addressing structure with plural data elements and a layer of electro-optical material in electrical communication with an ionizable gaseous medium captured between first and second substrate structures having respective first and second major surfaces in face-to-face relation, the layer of electro-optical material being responsive to selective ionization of the gaseous medium to address selected ones of the data elements, the improvement comprising:

multiple intersecting first and second channels within which the gaseous medium is captured, the first and second channels extending longitudinally in respective first and second transverse directions along the first major surface and being delimited by an array of plural spaced-apart islands projecting outwardly from the first major surface, each of the islands being aligned with a data element;

an ionizing structure that includes an elongated electrode positioned in each of the first channels and extending longitudinally in the first direction for selectively ionizing the gaseous medium; and ionizing drive means for delivering ionizing drive signals to the elongated electrodes in an immediately adjacent pair of first channels to ionize the gaseous medium in the vicinity of islands delimiting the immediately adjacent pair of first channels, thereby to address the data elements aligned with the islands.

2. The addressing structure of claim 1 in which the islands are arranged in substantially parallel straight rows of islands extending in the first direction, each first channel is positioned between a pair of adjacent rows of islands, and each second channel is positioned between a pair of adjacent islands in a row.

3. The addressing structure of claim 2 in which the islands in alternate ones of the rows are offset from each other.

4. The addressing structure of claim 2 in which the second channels delimited by the islands in a row bisect the islands in immediately adjacent rows.

5. The addressing structure of claim 1 in which the ionizing structure further includes multiple electrode spurs coupled to each elongated electrode and extending longitudinally in the second direction along second channels intersecting the first channel in which the elongated electrode is positioned.

6. The addressing structure of claim 1 in which each island includes a planar surface spaced apart from and substantially parallel to the first major surface and an electrically conductive material in contact with the planar surface and in communication with the gaseous medium, thereby providing electrical communication between the data element aligned with the island and the gaseous medium when it is selectively ionized for addressing the data element.

7. The addressing structure of claim 1 in which the elongated electrode positioned in each of the first channels includes a raised electrode structure projecting outwardly from the first major surface and extending longitudinally in the first direction to facilitate the gaseous medium being selectively ionized.

8. An electro-optical display system having plural display elements, comprising:
   first and second substrate structures with respective first and second inner major surfaces held in face-to-face relation;
   an array of plural spaced-apart islands projecting outwardly from the first inner major surface of the first substrate structure toward the second substrate structure and delimiting in the first substrate structure plural intersecting first and second channels that extend longitudinally in respective first and second transverse directions along the first inner major surface, each of the islands being aligned with a display element and including an outer surface in face-to-face relation with the second inner major surface and an electrical conductor on the outer surface distinct form the electrical conductors on the outer surfaces of other islands;
   plural optically transparent, electrically conductive electrodes positioned on the second inner major surface and extending generally along the second direction to overlap selected ones of the islands and carry display signals to the display elements;
   an ionizable gaseous medium captured within the first and second channels between the first and second substrate structures and in communication with the electrical conductors on the outer surfaces of the islands;
   an ionizing structure that includes an elongated electrode positioned in each of the first channels and extending longitudinally in the first direction to selectively ionize the gaseous medium to form an electrical coupling to the electrical conductors on the outer surfaces of the islands which coupling effects addressing of selected ones of the display elements; and
   a layer of material having electro-optical properties positioned between the first and second substrates and being responsive to the display signals delivered to the selected ones of the display elements addressed by the ionizing structure.

9. The display system of claim 8 further comprising ionizing drive means for delivering ionizing drive signals to the elongated electrodes in an immediately adjacent pair of first channels to ionize the gaseous medium in the vicinity of islands delimiting the immediately adjacent pair of first channels, thereby to address the data elements aligned with the islands.

10. The display system of claim 8 in which the islands are arranged in substantially parallel straight rows of islands extending in the first direction, each first channel is positioned between a pair of adjacent rows of islands, and each second channel is positioned between a pair of adjacent islands in a row.

11. The display system of claim 10 in which the islands in alternate ones of the rows are offset from each other.

12. The display system of claim 10 in which the second channels delimited by the islands in a row bisect the islands in immediately adjacent rows.

13. The display system of claim 8 in which the ionizing structure further includes multiple electrode spurs coupled to each elongated electrode and extending longitudinally in the second direction along second channels intersecting the first channel in which the elongated electrode is positioned.

14. The display system of claim 8 in which the outer surface of each island includes a planar surface spaced apart from and substantially parallel to the first major surface.

15. The display system of claim 8 in which the elongated electrode positioned in each of the first channels includes a raised electrode structure projecting outwardly from the first major surface and extending longitudinally in the first direction to facilitate the gaseous medium being selectively ionized.

* * * * *